Feb. 16, 1965 — B. F. PARR — 3,169,469
TOASTER
Filed May 2, 1962 — 3 Sheets-Sheet 2

INVENTOR
Bernard F. Parr
BY R. J. Eisinger
ATTORNEY

Feb. 16, 1965 B. F. PARR 3,169,469
TOASTER
Filed May 2, 1962 3 Sheets-Sheet 3
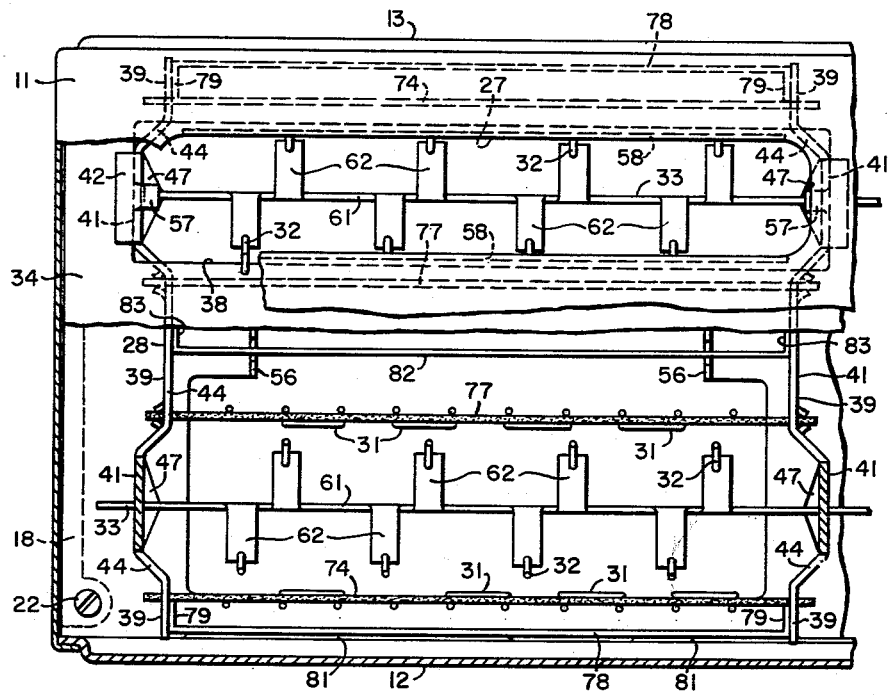
Fig. 7.
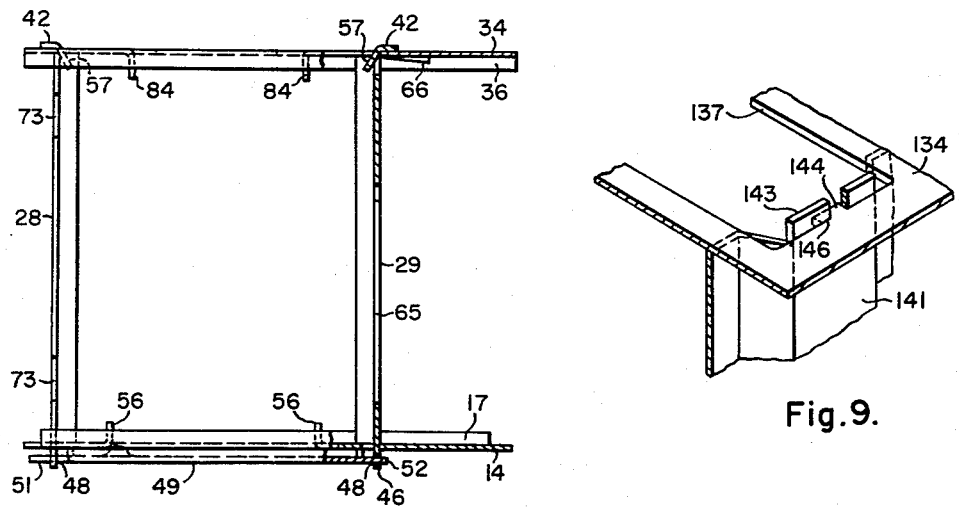
Fig. 8.
Fig. 9.

United States Patent Office 3,169,469
Patented Feb. 16, 1965

3,169,469
TOASTER
Bernard F. Parr, Mansfield, Ohio, assignor to Westinghouse Electric Corporation, East Pittsburgh, Pa., a corporation of Pennsylvania
Filed May 2, 1962, Ser. No. 191,891
9 Claims. (Cl. 99—400)

This invention relates to toasting apparatus and an object is to provide novel and improved apparatus of this kind.

A primary object of the invention is to provide a novel and improved toaster construction which is simple in structure and capable of being manufactured and assembled at low cost.

Another object is to provide an improved toaster construction which is made of metal stampings which can be readily assembled and interlocked together with a minimum amount of labor.

Another object is to provide a novel and improved toaster chassis construction in which the components are held together by interlocking parts or tabs in such a manner as to eliminate separate fastening elements.

Another object is to provide an improved electric toaster chassis assembly in which the components are held in assembled relation by means of interlocking parts, the final assembly being held together by the last structural component assembled.

The above and other objects are effected by the invention described herein as will be apparent from the following description, taken in connection with the accompanying drawings forming a part of this application, in which:

FIG. 7 is a horizontal section taken on line VII—VII of FIG. 4 with a portion of the top plate broken away;

FIG. 8 is a side elevational view, to a scale smaller than that of FIG. 7, showing the base plate, the top plate and the two end posts; and FIG. 9 is a fragmentary perspective view showing an alternate form of connection between the end posts and the top plate of the chassis.

Figure 1:
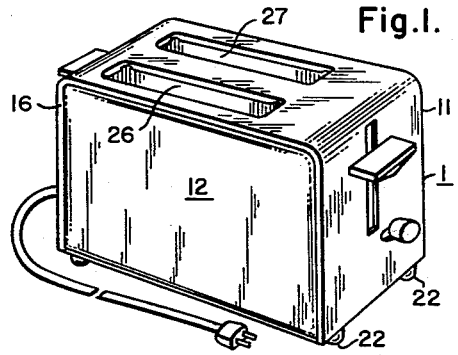
FIG. 1 is a perspective view of a toaster made in accordance with this invention.

It is to be pointed out here that, in general, only the elements of the toaster which are material to an understanding of the invention are shown in detail.

The present invention provides a novel and improved toaster construction embodying an outer casing or cover comprising four components: a bottom chassis base plate, two side panels, and an inverted U-shaped shell, all held together in assembled relation by interlocking surfaces on the components.

The shell is secured to the chassis base plate by resilient friction fasteners that have heads which serve as feet for the toaster. The toaster chassis assembly is mounted on the chassis base plate, all of the structural parts thereof being held in assembled relation by interlocking surfaces on the components, except that the toast guard wires are held in place only by gravity when the toaster is sitting upright and are held in place by the outer U-shaped shell when the toaster is in any other position.

The main structural components of the toaster chassis, such as the end posts and the top plate, are interlocked together during assembly operations. The end posts may be locked to the chassis base plate by tabs on a subplate which serves both as the final locking element for the chassis as well as a crumb tray. When the inverted U-shaped shell is locked to the chassis base plate, the subplate can be disengaged to remove bread crumbs while the shell holds all of the parts in assembled relation.

The above features are exemplified in the illustrated embodiment of the invention shown in the drawings, where the toaster has a casing 1 which includes an inverted U-shaped shell 11, two external side panels 12 and 13 and a chassis base plate 14, and U-shaped shell 11 being suitably secured to the chassis base plate 14. The U-shaped shell 11 has inturend flanges 16 along its opposite margins and the chassis base plate 14 has upturned side flanges 17. When the shell 11 is in assembled relation with the side panels 12, 13 and the chassis base plate 14, the flanges 16 overlap and engage the top and end edges of the panels 12, 13 while the bottom edges of these panels are overlapped and engaged by the flanges 17 on the chassis base plate. It will be seen later that a toaster chassis 2, including the chassis base plate 14, is of such transverse dimension as to hold the panels 12, 13 against the flanges on the shell 11 and the chassis base plate 14.

Each leg of the U-shaped shell 11 has an inturned flange 18, each flange being provided with holes 19 adapted to register with holes 21 in the chassis base plate 14 when the shell and the chassis are in assembled relation. The flanges 18 are held against displacement from the ends of the chassis plate 14 by means of four resilient friction fasteners 22, one at each corner of the plate 14. These fasteners have a pair of spaced resilient tangs 23 having convex outer surfaces, the tangs being adapted to engage the holes in the flanges 18 and the chassis base plate 14. These fasteners also have hemispherical heads 24 that serve as feet for the toaster. The shell 11 is provided with rectangular bread slice openings 26 and 27 aligned with bread slice openings in the top plate of the chassis, later described.

Figure 2:
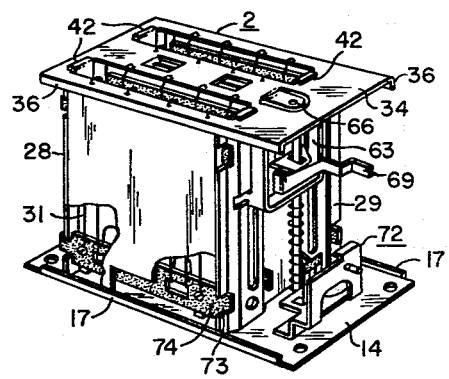
FIG. 2 is a perspective view of the toaster chassis assembly in accordance with the present invention.

The toaster chassis 2, shown in perspective in FIG. 2, includes all of the components usually contained in the toasting chamber, as well as those components constituting the timing control mechanism. The space that corresponds to the usual toasting chamber is embraced between two end posts 28 and 29, supported on the chassis base plate 14, and in this space the electric heating elements 31, toast guard wires 32 and bread slice carriers 33 are located. The end posts 28 and 29 are locked to the chassis base plate 14 in a manner hereinafter described. The main structure of the chassis is completed by a top plate 34, having downturned marginal stiffening flanges 36, which bridges the tops of the end posts 28 and 29 with the flanges 36 in overlapping engagement with the notched upper ends of the end posts. The top plate 34 is provided with bread slice openings 37 and 38, which are in vertical alignment with bread slice openings 26 and 27, respectively, in the U-shaped shell 11.

The identical end posts 28 and 29 are corrugated, providing planar portions 39 and 41. The end posts 28 and 29 are very thin and are preferably made of sheet metal. The corrugations greatly strengthen the end posts and give them the effect of thickness in the direction of the longitudinal axis of the chassis 2.

The end posts 28 and 29 are interlocked with the top plate 34 by a form of interlocking connection in which the connection is effected by moving the end posts upwardly to the top plate and then moving them away from each other. In the embodiment of such connection shown in FIGS. 2 to 8, the planar portions 41 have longitudinally offset transverse tabs 42. These tabs can be considered to include a longitudinal portion 43, extending beyond the top supporting edges 44 of the end posts 28 and 29, as shown in FIG. 8, by an amount substantially equal to the thickness of the top plate 34. The tabs 42 of end post 28 overlie and engage the upper surface of the top plate 34 at one end of the respective bread slice openings 37 and 38, while the tabs of the end post 29 overlie and engage the top surface of top plate 34 at the opposite respective ends of these openings.

As shown in several views, and particularly in FIG. 7, the planar portions 39 of the end posts 28 and 29 are displaced inwardly of the chassis 2 so that the upper supporting edges 44 of the central planar portions 39 engage the lower surface of the top plate 34 between the bread slice openings 37, 38, and the upper supporting edges of the outer planar portions 39 engage the top plate outwardly of these slice openings.

The tabs 42 on the end posts cooperate with the upper supporting edges 44 of the end posts 28, 29, in engagement with the underside of top plate 34, to provide, effectively, respective locked hinge joints between the end posts 28, 29 and the top plate 34. This is illustrated in several views and particularly in FIG. 8. Because the upper supporting edges 44 of the end posts engages the lower side of the top plate 34 inwardly of the out-turned tabs 42, end post 28 will be locked against pivotal movement with respect to the top plate 34 in the counter-clockwise direction, as viewed in FIGS. 4 and 8, while the end post 29 will be locked with the top plate 34 against clockwise movement with respect to the latter. The opposing locked connections between the end posts 28, 29 and the top plate 34 cooperate with the stiffening flanges 36 along the marginal edges of the top plate 34 to provide a firm toaster chassis assembly made of very thin sheet metal.

Each of the end posts 28, 29 has a pair of tongues 46 at its bottom end extending through apertures 47 in the chassis plate 14. For the purpose of facilitating assembly, these apertures are triangular in shape in accordance with the well-known manufacturing practices. The tongues 46 on each end post are provided with slots 48. Each of the end posts 28, 29 is adapted to be secured to the chassis plate 14 by means of pinning elements extending transversely through the slots in the tongues of the end posts.

Carrying out this function, a subplate 49 having one pair of tabs 51 on one end and a second pair of tabs 52 on the other end, is adapted to lie against the bottom side of the chassis plate 14. As will be apparent from subsequent description, plate 49 serves in a dual role as a locking member for the end posts 28, 29 and as a crumb tray. The chassis plate 14 is provided with a large central opening 53 which permits bread crumbs to drop onto the subplate 49.

Figure 4:
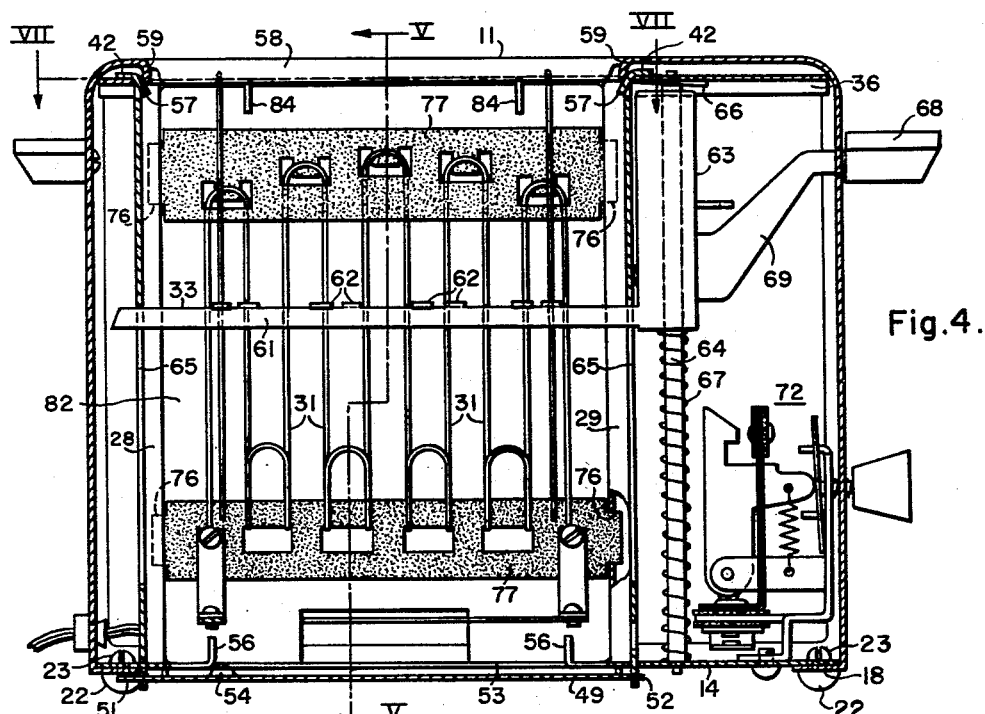
FIG. 4 is a sectional elevational view of the toaster, taken on line IV—IV of FIG. 5 and looking in the direction of the arrows.

The length of the tabs 51 is about twice the length of the tabs 52 and the length of the main body of the plate 49 is less than the distance between the tongues 46 on the end posts 28, 29 by an amount substantially equal to the length of the tabs 52. This permits assembling and affixing the end posts 28, 29 to the chassis base plate 14 by first inserting the tongues 46 of the end posts through the apertures 47 in the chassis base plate 14 and then inserting the tabs 51 all the way in the slots of the tongues of one of the end posts, for example, end post 28, after which the plate 49 can be brought up flush against the bottom of the chassis plate 14 and then be slid in the opposite direction so that the tabs 52 engage the slots in the tongues on the bottom of end post 29. As best shown in FIG. 4, a dimple 54 in the subplate 49 engages a tab 56 on the chassis plate 14 to prevent accidental displacement of tabs 52. When this is done, the end posts 28, 29 are securely fixed to the top of the chassis plate 14 so that the lower edges of the corrugations of the posts, in engagement with the top of the chassis plate 14, give the effect of thickness of a dimension equal to the depth of the corrugations of the end posts, or, in other words, give the effect of a stiff flange on a stiff structural member. Since the end posts 28, 29 are secured to the chassis base plate 14 at what, effectively, corresponds to the outer edge of such a simulated stiff flange, the end posts 28, 29 will be locked against pivotal movement relative to the chassis base plate 14 in opposite respective directions. From the previous description, it will be seen that in the complete chassis assembly 2, the connections between the end posts 28, 29 and the chassis base plate 14 supplement the connections between end posts 28, 29 and the top plate 34 in providing a firm unitized assembly which is of sufficient strength for manufacturing operations.

One of the salient features of the present invention is the novel construction which makes it possible to fabricate the chassis 2 of thin, lightweight sheet metal in order to reduce the cost of material and manufacturing operations. It is necessary only that the sheet metal of the chassis 2 be of such gauge as to provide a reasonably firm assembly during manufacturing operations, but which when engaged and supported by the outer casing will withstand normal use. The locked joint construction, in cooperation with the corrugations of the end posts described above, provides such an assembly that satisfies manufacturing requirements. The final assembly is supported and given the necessary rigidity and strength required of the end product by means of the U-shaped shell 11.

Figure 5:
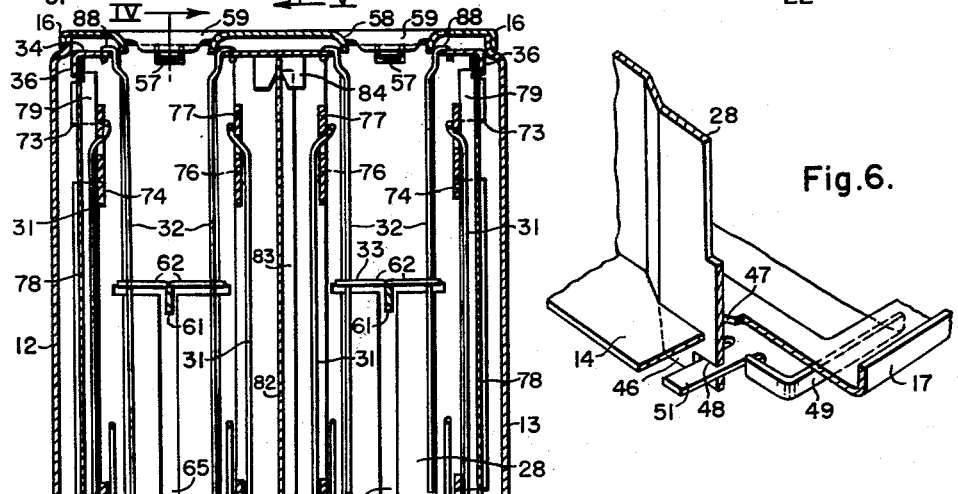
FIG. 5 is a sectional elevational view taken on line V—V of FIG. 4 and looking in the direction of the arrows.
Figure 6:
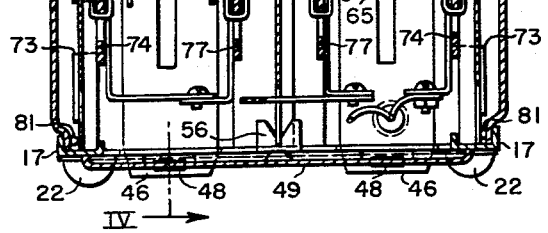
FIG. 6 is a fragmentary perspective view, partly in section, showing the manner in which end-post members of the chassis are secured to the chassis plate.

To this end, as shown in FIG. 4 and FIG. 7, the upper ends of the end posts 28, 29 immediately adjacent the transverse tabs 42, are provided with struck-out tabs 57. These tabs are inclined downwardly and oppositely from the transverse tabs 42. As shown in FIG. 4, the end posts 28, 29 are assembled with the transverse tabs 42 facing outwardly of the assembly overlying the top surface of the top plate 34 at the ends of the bread slice openings 37, 38 and the tabs 57 face inwardly of the chassis 2. As seen in FIG. 5 and FIG. 7, the inclined tabs 57 are in alignment with the bread slice openings in both the shell 11 and the top plate 34.

The bread slice openings 26 and 27 in the shell 11 are provided with inturned flanges 58 extending lengthwise of the openings and have inturned tabs 59 at the ends of these openings.

When the shell 11 is assembled over the chassis 2 with the flanges 18 on the lower ends of the legs of the shell 11 hooked under the ends of the chassis plate 14, as shown in FIG. 4, the marginal flanges 16 overlap and engage the top and end marginal edges of the side panels 12, 13 and clamp them against the downturned flanges 36 on the edges of the top plate 34 while the flanges 58 engage and clamp the toast guard wires 32 against the inner edges of the bread slice openings 37, 38 to firmly position the top of the chassis 2 transversely with respect to the shell 11 at the same time the tabs 59 on the shell 11 engage the tabs 57 on the end posts 28, 29 to provide a wedging fit and thereby accurately position the chassis 2 and hold it firmly against longitudinal movement with respect to the shell 11, as well as the chassis plate 14.

At the same time, the bottom margins of the side panels 12 and 13 fit inside of the upturned flanges 17 on the chassis plate 14. The distance between the insides of the flanges 16 on the U-shaped shell 11 is the same as the distance between the insides of the upturned flanges 17 on the chassis plate 14. The depth of the indentations 81 is substantially the same as the thickness of the flanges 36, so that the distance between the indentations on the opposite side panels is the same as the distance between the insides of the flanges 36 to retain the hereinafter mentioned reflector panels 78 the same distance apart at the top and at the bottom. For the purpose of giving some idea of relative values, the top plate 34 is made of thin sheet metal of a thickness in the range of .025 to .032 inch while the side panels 12 and 13 and the chassis base plate are made of sheet metal of thicknesses ranging from .020 to .025 inch.

Bread slice carriers 33, for supporting the bread to be toasted, are arranged below the bread slice openings 37 and 38 in the top plate 34 of the chassis 2, and comprise arms 61 substantially coextensive with the length of the toasting compartment. Cross arms 62 extend transversely from the arms 61, which are supported on a carriage 63. The carriage is slidably supported upon a vertical rod 64, the lower end of which is supported by the chassis plate 14 and the upper end of which engages an aperture in a tongue 66 of the top plate 34. A suitable compression spring 67, surrounding the rod 64 and interposed between the carriage 63 and the chassis plate 14, biases the carriage to its upper position. The carriage 63, with the slice carriers 33, is movable between its upper position and a lower toasting position. A suitable handle 68 on an arm 69, secured to the carriage 63 and extending through slot 71 in the shell 11, is provided for manual actuation of the carriage 63.

The carriage 63 is retained in its lower, or toasting, position by a suitable timer-operated latch mechanism generally indicated at 72, and is automatically released thereby after a predetermined period of time. The details of the latch mechanism are not material to the present invention.

The heating elements 31 constitute no part of the present invention and are more fully described and claimed in U.S. Patent No. 2,778,912, owned by the assignee of this application. However, the present invention contemplates a novel manner of supporting the insulating strips on which these heating elements are mounted.

In this connection, the end posts 28, 29 are provided with notches 73 in their outer edges which receive the mica insulating strips 74 on which the outer heating elements 31 are mounted. These end posts 28, 29 are also provided with slots 76 which are engaged by the ends of the insulating strips 77 which support the inner heating elements.

Figure 3:
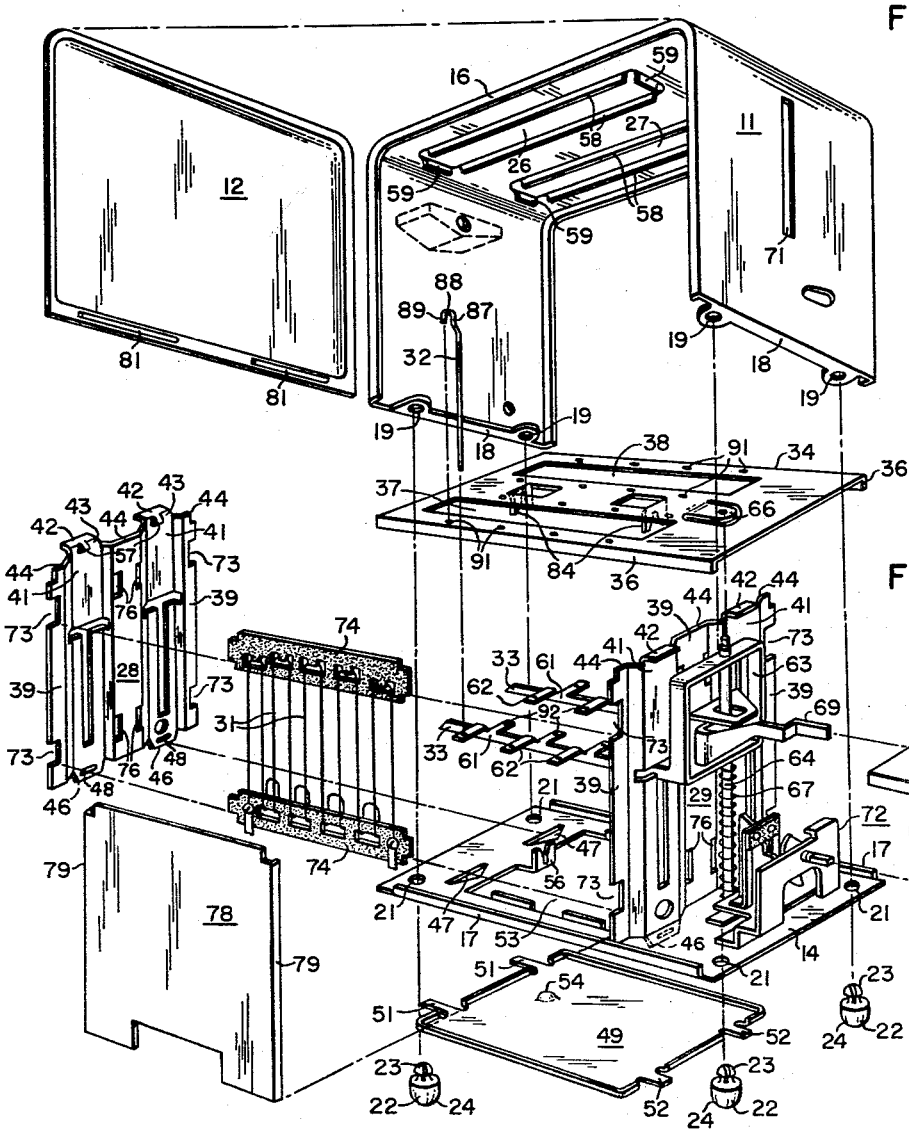
FIG. 3 is an exploded view showing the various components in perspective.

As shown in FIGS. 3 and 5, outer heat reflector plates 78 are provided with marginal flanges 79. The plates 78 are of such width that the flanges 79 fit between the end posts 28, 29 and the width of the flanges 79 is such that when the reflector plates 78 are in assembled relation, with the stiffening flanges 36 of the top plate 34 overlapping the upper ends of the outer reflector plates 78 and the indentations 81 bearing against the lower ends of said reflector plates, the inner edges of the flanges 79 will rest against the insulating strips 74, received in the notches 73 in the outer edges of the end posts 28, 29.

In the interest of reducing the number of different parts, a center heat reflector plate 82, identical with the outer reflector plates 78 and having flanges 83, is held between slotted depending tabs 84 on the top plate 34 and upstanding tabs 56 on the chassis base plate 14. In this instance, the flanges 83 serve primarily as stiffening elements.

The toast guard wires 32, provided for positioning the bread slices in the toasting wells, that is, the space between the center heat reflector 82 and the two outer reflectors 78, are provided with offset portions 87, transverse portions 88 and terminate in hook portions 89. The hook portions 89 engage holes 91 in the top plate 34 and the lower ends of the guard wires 32 slidably engage holes 92 in the outer ends of cross arms 62 carried by the arms 61 of the slice carriers 33. As shown in FIG. 5, when the shell 11 is in assembled relation over the chassis 2, the downturned flanges 58 of the bread slice openings of the shell engage the upper ends of the toast guard wires 32 between the transverse portions 88 and the offset portions 87 and hold them against displacement.

*Assembly*

The accomplishment of the main objective of this invention is predicated upon the design and fabrication of parts which can be easily manufactured and assembled. Although some variation is possible, the major components must be assembled in a predetermined sequence in order to carry out this objective. The preferred method of assembly is carried out with the use of a suitable fixture adapted to hold the top plate 34 upside down. The fixture includes two pivoted members adapted to receive, support and guide the end posts 28, 29 in inclined positions relative to said top plate so that tabs 42 enter the bread slice openings 37, 38 in the top plate 34 near the ends thereof. Next, the heating elements are brought into position and held by the fixture relative to the top plate 34 so that when the end posts 28, 29 are swung simultaneously into positions perpendicular to the top plate 34, the outer ends of the mica insulating strips 77, 74 on which the heating elements are supported will engage the slots 76 and the notches 73, respectively, in the end posts 28, 29. The center reflector plate is placed in position in engagement with the tabs 84, and the outer reflector plates are brought into position by inserting the upper margins in back of the flanges 36 on the top plate. The carriage 63, on which the toast carriers 33 are mounted, is then brought into position by inserting the arms 61 and the cross arms 62 through cross-shaped openings 65 in the end post 29. The upper end of the rod 64, on which the carriage 63 is slidably mounted in the final assembly, is inserted in the hole in the tongue 66 on the top plate 34, after which the compression spring 67 is slid onto the rod. Next, the bottom chassis plate 14 is added to the assembly by directing the tongues 46 of the end posts 28, 29 through the triangular openings 47 in the chassis plate 14. The end posts 28, 29 are secured to the chassis plate by inserting the long tabs 51 of the subplate 49 through the slots 48 until the corresponding end of the subplate engages the end posts 28, after which the subplate is brought against the bottom of the chassis plate 14 and then moved in the opposite direction until the other end of the subplate 49 engages the end post 29. This completes the assembly of the structural components of the chassis 2. The assembly may now be removed from the fixture and turned right side up. The timer-operated latch mechanism 72 is then secured to the chassis plate 14 by any suitable means and the power cord is attached to the terminals of the timer switch and the heating elements. The toast guard wires 32 may be assembled any time after the toast carriers 33 are placed in position, by insertion of the lower part of the wires in the holes in the cross arms 62 and causing the hooked portions 89 to engage the holes 91 in the top plate 34.

To complete the final assembly, the side panels 12, 13 are positioned against the sides of the chassis 2, specifically against the flanges 36 and the lower ends of the reflector panels 78, after which the U-shaped shell is assembled in nested relation over the top of chassis 2 and the side panels with the inturned flanges 18 hooked under the chassis plate 14, as shown in FIG. 4. The friction fasteners 22 are then inserted in the holes in the flanges of the shell 11 and the holes in the chassis plate 14 to complete the assembly of the toaster.

From the foregoing description, it will be apparent that in accordance with this invention, a novel and improved toaster construction is provided wherein the outer cover, which must necessarily be firm and rigid to withstand normal use, serves as the rigidizing supporting and positioning structure for the complete assembly and the parts can be more precisely positioned than in previous constructions. This makes it possible to fabricate the inner chassis assembly from simple inexpensive parts, mostly of thin sheet metal. With the present construction, the inner chassis assembly need be only of such strength and rigidity as to facilitate assembly operations, and, when supported by the outer cover, to withstand normal use. Also, by the novel manner in which the parts are interlocked, a minimum of assembly operations and separate fastening elements is required. The construction reduces the number of different parts required.

In the alternate form of connection between the end posts and the top plate of the chassis shown in FIG. 9, each planar portion 141 of the end posts is extended upwardly through the bread slice opening 137 and above the top plate 134, as shown at 143, the projecting portion bearing against the end of the bread slice opening. The top plate 134 is formed with a longitudinal tongue 144 extending inwardly from each end of each bread slice opening and through a slot 146 in the projecting portion of the end post, thereby interlocking the end posts and the top plate.

While the invention has been shown in but one form, it will be obvious to those skilled in the art that it is not so limited, but is susceptible of various changes and modifications without departing from the spirit thereof.

What is claimed is:

1. In combination in a toasting apparatus,
a toaster chassis including
a chassis base plate having upturned edges along the longitudinal margins thereof, said chassis having upstanding end posts attached to said base plate,
a top plate bridging the tops of said end posts, said top plate having depending lateral flanges and being of a width substantially equal to the distance between said upturned flanges on said chassis base plate,
each of said posts having a pair of vertically spaced notches in each of its vertical edges, the notches in one of said posts being horizontally aligned with the corresponding notches in the other of said posts,
insulating members carrying heater wires and engaged in said notches,
reflector panels having inturned flanges along the marginal edges thereof assembled with the flanges facing inwardly of said chassis, the width of said flanges being such as to engage said insulating members when said reflector panels are assembled adjacent said posts with their upper ends engaged by the inner sides of said flanges on said top plate, and
a side panel overlying each of said reflector panels, the lower edges of said side panels being positioned between said upturned flanges on said chassis base plate and said chassis,
a U-shaped shell having inturned portions adapted to nest over said toaster chassis with said inturned portions overlapping the edges of said side panels, and
means for securing said U-shaped shell to said chassis base plate.

2. In a toasting apparatus,
a toaster chassis comprising,
a chassis base plate,
end posts carried by said base plate, said end posts being so shaped as to provide top supporting edges offset in directions transversely of said posts by an amount substantially greater than the thickness of the material of said posts,
a top plate resting on said supporting edges of said end posts, portions of said top plate cooperatively interlocking with portions of said end posts for securing said top plate against displacement from the supporting surfaces of said end posts,
said securing means in cooperation with said supporting surfaces on the respective end posts providing
connections between said top plate and said respective end posts locked against pivotal movement in at least one direction when said end posts are at right angles to said top plate, the connections between the respective end posts and said top plate being arranged to oppose relative pivotal movement in opposite directions from the locked positions.

3. In a toasting apparatus,
a toaster chassis comprising,
a chassis base plate,
end posts carried by said base plate, said end posts being so shaped as to provide top supporting edges offset in directions transversely of said posts by an amount substantially greater than the thickness of the material of said posts,
a top plate engaging said top supporting edges of said end posts,
means for securing said top plate against endwise displacement from the supporting surfaces of said end posts, said securing means in cooperation with said supporting surfaces on the respective end posts providing
connections between said top plate and said respective end posts locked against pivotal movement in at least one direction when said end posts are at right angles to said top plate, the connections between the respective end posts and said top plate being arranged to oppose relative pivotal movement in opposite directions from the locked positions,
the lower ends of said end posts being secured to said chassis base plate to hold said chassis in assembled relation to said chassis base plate.

4. In a toasting apparatus,
a toaster chassis comprising,
a chassis base plate,
end posts carried by said base plate, said end posts being so shaped as to provide top supporting edges offset in directions transversely of said end posts by an amount substantially greater than the thickness of the material of said end posts,
tabs on said end posts extending beyond the supporting edges,
a top plate having openings through which the tabs on said end posts extend,
portions of said tabs interlocking with portions of said top plate for securing said top plate against displacement from the upper supporting edges of said end posts,
said securing means in cooperation with said supporting surfaces on the respective end posts providing
connections between said top plate and respective end posts locked against pivotal movement in at least one direction when said end posts are at right angles to said top plate, the connections between the respective end posts and said top plate being arranged to oppose relative pivotal movement in opposite respective directions from the locked positions,
said end posts having tongues on their lower ends extending through apertures in said base plate, and
means for locking said tongues against longitudinal movement thereof relative to said base plate.

5. The combination as set forth in claim 4, in which the means for locking said tongues on said end posts against longitudinal movement is a subplate having tabs thereon received in slots in said tongues,
said tabs being arranged in pairs with one pair on one end of the subplate and the other pair on the other end,
the length of the tabs of one pair being longer than the tabs of the other pair, said subplate being less than the distance between the tongues on said posts by an amount substantially equal to the length of the shortest tab, whereby the longer tabs can be engaged in the slots in the tongues of one post and then moved in the opposite direction to cause the tabs on the other end of said subplate to engage the slots in the tongues of the second post while the longer tabs remain engaged in the slots in the tongues of the first post.

6. In a toasting apparatus,
a toaster chassis comprising,
a chassis base plate, end posts carried by said base plate, said end posts being so shaped as to provide top supporting edges offset in directions transversely of said posts by an amount substantially greater than the thickness of the material of said end posts, a top plate engaging said top supporting edges of said end posts, means for securing said top plate against displacement from the supporting surfaces of said end posts, said securing means in cooperation with said supporting surfaces on the respective end posts providing connections between said top plate and said respective end posts locked against pivotal movement in at least one direction when said end posts are at right angles to said top plate, the connections between the respective end posts and said top plate being arranged to oppose relative pivotal movement in opposite directions from the locked positions, the lower ends of said end posts being provided with tongues extending through apertures in said base plate, said tongues having openings therein, a subplate adapted to rest against the bottom of said chassis plate, said subplate comprising a crumb tray adapted to lie across a central opening in said base plate, said subplate having a pair of tabs on the opposite ends thereof, the tabs on one end of said subplate being longer than the tabs on the other end of said subplate and the distance from the end of the subplate having the longer tabs to the end of the shorter tabs on said subplate being slightly less than the distance between the tongues on the lower ends of said end posts whereby the longer tabs on said subplate may be inserted through the openings in the tongues on one of the end posts to permit the engagement of the short tabs on the opposite end of said subplate with the openings in the tongues on the lower end on the other end posts to thereby lock both of said end posts against longitudinal movement relative to said chassis plate.

7. In a toasting apparatus,
a toaster chassis comprising,
a chassis base plate,
end posts carried by said base plate, said end posts being so shaped as to provide top supporting edges offset in directions transversely of said posts by an amount several times greater than the thickness of the material of said posts, transverse tabs on the upper end of said end posts offset longitudinally above said supporting edges, a top plate having elongated bread slice openings extending longitudinally of said chassis, said transverse tabs being offset above said supporting edges of said end posts by an amount substantially equal to the thickness of said top plate, said transverse tabs extending outwardly of said chassis and engaging the top surface of said top plate at the ends of said slice openings, the interlocking engagement of said tabs with the upper surface of said top plate cooperating with the engagement of the supporting edges with the lower side of said top plate when said end posts are at right angles to said top plate to provide connections between said top plate and the respective end posts, said connections being locked against pivotal movement in at least one direction when said end posts are at right angles to said top plate, the connections between the respective end posts and said top plate being arranged to oppose relative pivotal movement in opposite directions from the locked positions, the lower ends of said end posts being secured to said chassis base plate to secure said chassis in assembled relation to said chassis base plate.

8. In combination in an electric toaster,
a chassis base plate having upturned flanges along the longitudinal side margins thereof, a toaster chassis supported by said chassis base plate, said toaster chassis being of substantially the same width as the distance between said upturned flanges on said chassis base plate, a pair of side panels, the lower edges of which are positioned between said upturned flanges of said chassis base plate and said toaster chassis, said chassis comprising:

spaced end posts and a top plate bridging the tops of said end posts and having elongated bread slice openings extending longitudinally of said top plate, said end posts being connected to said top plate adjacent the respective ends of said bread slice openings and having tabs inclined downwardly and inwardly of said chassis from points immediately below the ends of said slice openings in said top plate, an inverted U-shaped shell having inturned flanges along the outer marginal edges thereof and adapted to nest over said toaster chassis with said inturned flanges overlapping the marginal edges of said side panels while the lower edges of said panels are overlapped by said flanges on said chassis base plate, said shell having bread slice openings adapted to register with said bread slice openings in said top plate when said shell is in assembled relation with said chassis, the ends of said bread slice openings in said shell having inturned flanges engaging said inclined tabs on said end posts and providing a wedging fit between said tabs on said end posts and the end flanges of said bread slice openings in said shell.

9. Toasting apparatus comprising
an inverted U-shaped shell having inturned flanges along the lateral margins thereof, a base plate having upturned flanges along the lateral marginal edges thereof, side panels, the inturned flanges of said U-shaped shell and the upturned flanges of said base plate overlapping the edges of said side panels to hold them against outward displacement when said U-shaped shell is secured to said base plate, the ends of the base of said U-shaped shell having inturned portions, said latter portions overlapping and engaging portions of said base plate, said portions on said shell having holes registering with holes in said portions of said base plate and means engaging said registering holes for retaining said portions on said shell against displacement from said base plate, said retaining means having resilient expansible portions which engage the holes in said inturned portions on said leg and in said base plate and also having headed portions which serve as supporting feet for said toasting apparatus.

References Cited in the file of this patent
UNITED STATES PATENTS

| | | |
|---|---|---|
| 2,131,278 | Gough | Sept. 27, 1938 |
| 2,379,709 | Heilman | July 3, 1945 |
| 2,566,904 | Palmer | Sept. 4, 1951 |
| 2,597,023 | Olving | May 20, 1952 |
| 2,667,828 | Koci | Feb. 2, 1954 |
| 2,778,912 | Palmer et al. | Jan. 22, 1957 |
| 2,838,989 | Clark et al. | June 17, 1958 |
| 2,849,201 | Schelgunov | Aug. 26, 1958 |
| 2,907,269 | Rodwick et al. | Oct. 6, 1959 |
| 3,025,557 | Knowlton | Mar. 20, 1962 |